June 8, 1954
S. F. ARMINGTON
2,680,611
SPRINGING ARRANGEMENT FOR VEHICLE AXLES
Filed July 16, 1949
2 Sheets-Sheet 1
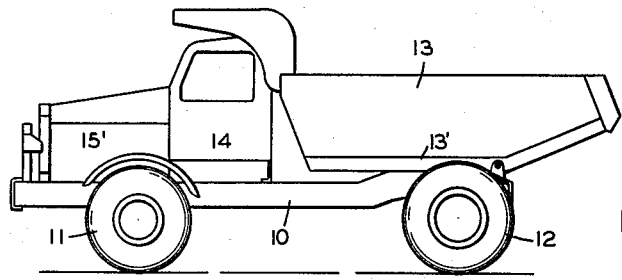
FIG.-1
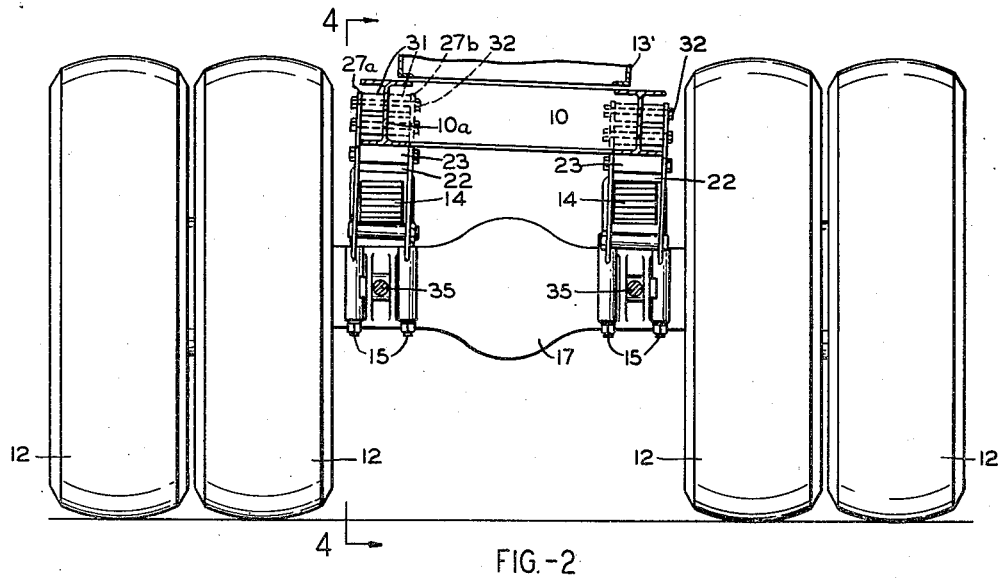
FIG.-2
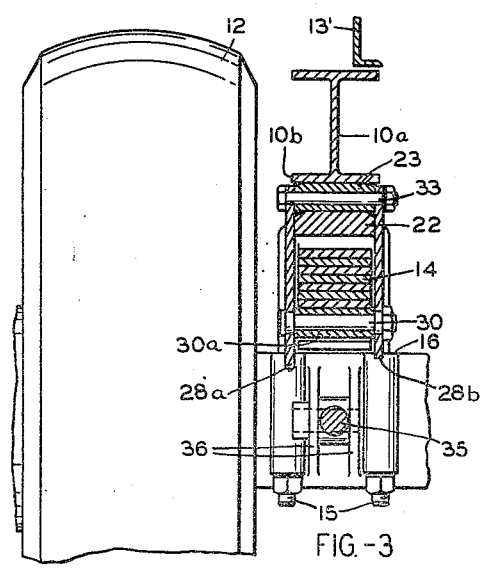
FIG.-3
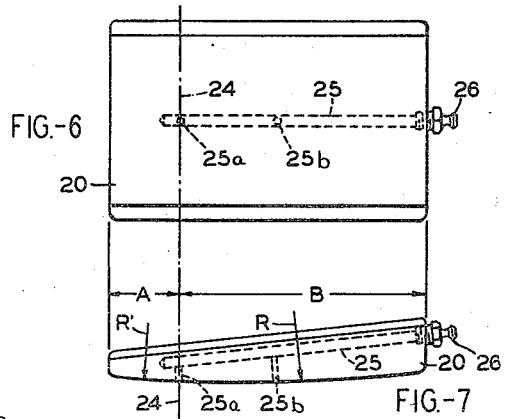
FIG.-6
FIG.-7
INVENTOR.
STEWART F. ARMINGTON
BY
*Hyde, Meyer, Baldwin & Doran*
ATTORNEYS June 8, 1954  S. F. ARMINGTON  2,680,611
SPRINGING ARRANGEMENT FOR VEHICLE AXLES
Filed July 16, 1949  2 Sheets-Sheet 2

INVENTOR.
STEWART F. ARMINGTON
BY
Hyde, Meyer, Baldwin & Dora
ATTORNEYS

Patented June 8, 1954

2,680,611

UNITED STATES PATENT OFFICE 2,680,611

SPRINGING ARRANGEMENT FOR VEHICLE AXLES

Stewart F. Armington, Willoughby, Ohio, assignor, by mesne assignments, to General Motors Corporation, Detroit, Mich., a corporation of Delaware Application July 16, 1949, Serial No. 105,194

3 Claims. (Cl. 267—56)

This invention relates to improvements in a springing arrangement for vehicle axles, and more particularly to a springing arrangement for very large heavy duty off-the-highway vehicles.

One of the objects of the present invention is to provide a springing arrangement for a heavy vehicle of the type described wherein the overall width of the vehicle is held within reasonable limits.

Another object of the present invention is the mounting of the leaf springs on opposite sides of the vehicle closer together to retain the desired vehicle dimensions while still retaining the desired lateral stability.

A further object of the present invention is to provide a novel construction of curved spring seats at the opposite ends of a heavy leaf spring so as to give a graduated springing effect from light to loaded body conditions.

A further object of the present invention is the provision of novel rebound stops mounted in a novel manner beneath an intermediate portion of the leaf spring so that the spring will resist any upward action that may occur when the truck is swaying from side to side.

Other objects and advantages of the present invention will be apparent from the accompanying drawings and description and the essential features will be set forth in the appended claims.

In the drawings,

Fig. 1 is a side elevational view illustrating one type of heavy duty off-the-highway vehicle to which my invention may be applied with advantage;

Fig. 2 is a partial rear elevational view enlarged of the vehicle of Fig. 1 showing the arrangement of the springing structure with relation to the truck body, the axle, and the wheel support;

Fig. 3 is a fragmental sectional view taken along the line 3—3 of Fig. 4;

Fig. 6 is a top plan view of one of the spring seats of Figs. 4 and 5; while

Fig. 7 is a side elevational view of the spring seat of Fig. 6.

Figure 4:
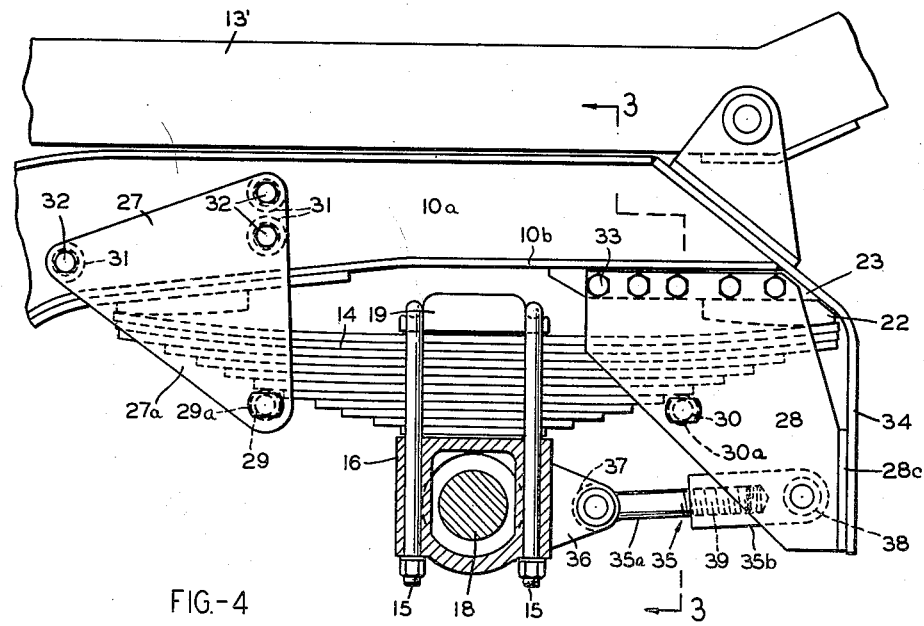
Fig. 4 is a fragmental view taken along the line 4—4 of Fig. 2.

It is common practice for rubber tired tractors and trucks designed for use over rough roads or off-the-highway to have the drive axle either rigidly or semi-rigidly attached to the frame. In this off-the-highway type of service with very rough and uneven haul roads or no haul roads at all, heavy duty trucks with conventional springing generally have had to travel relatively slowly due to spring rebound and side sway. Under these conditions sprung trucks have been considered impractical and, where used, the spring breakage has been a very large maintenance item. With the development of off-the-highway rubber tired equipment a large percentage of users have improved their haul roads, increasing the speed of their machines, resulting in increased production. On the improved type of off-the-highway haul road, for operation at high speeds a demand for a truck with an improved spring suspension has developed. At the same time, trucks equipped with a sprung rear axle will sometimes encounter extremely large bumps on the haul road where there will be a greater tendency to bounce or sway from side to side. It is the object of the current invention to solve this problem. At the same time, such trucks will sometimes encounter extremely bad conditions on a hauling road where there will be a greater tendency to bounce or sway from side to side. It is the object of the present invention to solve this problem.

In Fig. 1, I have shown a side elevational view of a heavy duty vehicle of the type discussed. This vehicle has a main frame 10 supported by front wheels 11 and rear wheels 12. On the frame is mounted a heavy rear dump body 13, a cab 14 and a hood 15' which covers an engine by means of which the front or rear axle or both are driven. It will be noted in Fig. 2 that a pair of leaf springs 14 of the multiple leaf type extend in fore-and-aft direction immediately beneath the two main side frame members 10a. Shackle bolts 15 secure the central portions of these springs to suitable seats 16 on the drive axle housing 17, which in turn houses a driving axle 18 which has a driving connection with the wheels 12. Observing Fig. 2, and bearing in mind the size of the parts involved, it will be obvious that the problem here is different from that encountered in small and medium size trucks with tires under twelve inch sectional diameter. Vehicles of the type disclosed in the present application are designed to carry loads up to twenty and thirty tons. The lateral distance between the main frame members 10a runs up to three feet and more. The tires 12 are from sixteen to eighteen inches in sectional diameter so that, allowing proper clearances, the construction shown in Fig. 2 is necessary to avoid an overall width greater than eleven feet which is regarded as undesirable in the trade.

The leaf springs 14 are of very heavy character. To illustrate the character, it should be understood that the spring shown comprises leaves six inches wide and five-eighths of an inch thick of silico-manganese steel, there being three leaves fifty-five inches long and nine shorter leaves, the shortest of which is eleven inches long. There is about eleven inches of flat spring in the center when the spring is free and about a one and one-half inch arch concave upwardly on fifty inch center lines when the spring is free as illustrated in Fig. 4. Two U-shape shackle bolts 15 extend over a steel clamping bracket 19 and secure the central portion to the spring to suitable seats 16 on the axle housing 17.

The forward end of each leaf spring 14 is supported on a spring seat 20 which is welded to a reinforcing plate 21 which in turn is welded to the bottom flange 10b of the frame member 10a. The rear end of each leaf spring is supported on a spring seat 22 which is welded to an elongated block 23 which in turn is welded to the bottom flange 10b of the frame member 10a. The front spring seat 20 is shown more in detail in Figs. 6 and 7 and the principle utilized is the same in the rear spring seat 22. Referring to Figs. 6 and 7, the bottom of the spring seat 20 is curved in a fore-and-aft direction, the curvature changing along the line 24. For a distance A which includes a little less than twenty-five percent of the forward end of the spring seat, the curvature is on a radius R' which is relatively short and in one embodiment is of the order of fifteen and one-half inches radius. The distance B then includes a little more than three-quarters of the fore-and-aft dimension of the spring seat and along this portion of the seat, the bottom curvature is at a radius R which is of the order of one-hundred and thirty-six inches in the same embodiment. This provides a node at the point 24 where the top leaf of spring 14 engages the front and rear spring seats 20 and 22 respectively when the vehicle is under normal load. Means is provided for feeding grease to the bottom of the spring seats 20 and 22. As shown in Figs. 6 and 7, a main grease channel 25 extends through the center of spring seat 20 in a fore-and-aft direction and is provided with a grease fitting 26 at its rear end. Lateral channels 25a and 25b extend downwardly from the main channel 25 to feed grease to the inner face between the bottom of the spring seat 20 and the top leaf of spring 40. The channel 25a is approximately along the zone 24 and the channel 25b is in approximately the midportion of the long radius surface indicated by the radius R.

Front and rear snubber pin brackets 27 and 28 respectively support snubber pins 29 and 30 respectively. It will be noted that pins 29 and 30 are out of vertical alignment below spring seats 20 and 22 respectively and toward the housing 17. These provide rebound stops underneath the spring a considerable distance from the free ends of the spring so that the spring will resist any upward action that may occur when the truck is swaying from side to side. This is quite important because when a truck body sways, one spring receives a sharp downward load while the spring on the opposite side actually receives a load upwards. The snubber pins 29 and 30 act as rebound stops to limit the amount of upward travel of the spring and, in this way, reduce the possible amount of sway. Referring to Fig. 4, which shows the condition of the spring 14 with the body unloaded, it will be noted that the snubber pins 29 and 30 actually contact the bottom leaf of the spring just above each snubber pin.

Actually, there is such a contact of the snubber pins with the spring leaves where there is not any load on the spring, not even the empty body. Any tendency to rebound or roll sideways brings these snubber pins up firmly against the under side of the spring. Note that the point of pin contact is approximately mid-way between the central heavy part of the spring and the free end of the spring. Any tendency of the vehicle body to lift up on one side, causes a further movement of these snubber pins 29 and 30 upwardly at which time the pins have a leverage to bend the spring upwardly at points on the axle side of each spring seat using the adjacent spring seat as a fulcrum, which tends to make an S bend in the spring which gives a tremendous resistance to further rebound and side roll. At the same time, this resistance to rebound is taken pretty much throughout the entire length of the spring, but especially in the very strong portion of the spring at the point adjacent the snubber pins.

The bracket 27 consists of two generally triangular side plates 27a and 27b which are bolted on opposite sides of the side frame member 10a which itself is generally of I-beam form. Collars 31 as best seen in Figs. 2 and 4 fill in the space from the central web of the beam 10a out to a plane passing through the edges of the upper and lower flanges of the I-beam 10a so that the plates 27a and 27b may extend flush with the flanges of the I-beam. Bolts 32 extend entirely through the collars 31 and the plates 27a and 27b to hold the bracket firmly in position. The snubber pin construction consists of the bolt 29 which extends through the plates 27a and 27b and the pin is surrounded by a sleeve 29a which abuts the spring 14. This construction will be clearly understood from Fig. 3 which goes through the snubber pin 30 which is of the same construction. The bolt is shown at 30 and the surrounding sleeve is indicated at 30a.

The rear bracket 28 as clearly shown in Figs. 3 and 4 is secured by a number of bolts 33 which pass through side plates 28a and 28b and through the block 23 previously mentioned which is secured to the bottom flange 10b of the beam 10a. The lower rear ends of the bracket 28 are connected together by a plate 28c which is welded to the plates 28a and 28b and in turn is secured to a frame member 34.

The construction on the opposite side of the vehicle is the same as that already described. It will be noted that the brackets 27 and 28 in addition to supporting the snubber pins 29 and 30, also act as side guides for the leaves of springs 14 as will be clearly apparent from Figs. 2 and 3. The brackets 27 and 28 also take the vehicle side thrust.

The usual tie rods 35 are provided to hold the axles in position. Ears 36 on the axle housing are pinned to the eye 37 of tie rod part 35a. Trunnions 38 on bracket 28 hold a pin through tie rod part 35b. A loose thread 39 connects tie rod parts 35a and 35b to permit lateral tilting of the axle.

Figure 5:
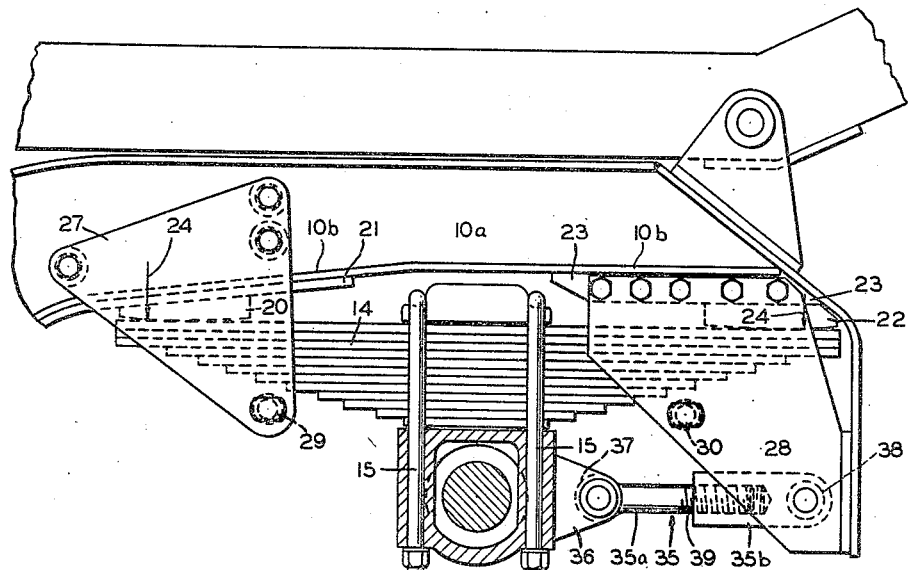
Fig. 5 is a view similar to Fig. 4 showing another position of the parts.

It will thus be seen that I have provided a construction wherein the springs are located immediately beneath the main frame beams of the vehicle body. The vehicle tires are immediately adjacent the frame beams with no lost space, thus holding the overall width of the vehicle to a minimum. The springs are immediately adjacent the tires giving a maximum stability. The spring seats consist of wide curved supports giving a graduated springing effect from light to loaded conditions. When the truck is light, as shown in Fig. 4, the spring will rest on the forward edge of seat 20 and on the rearward edge of seat 22, giving the longest possible effective spring length so that the maximum flexing effect will result. When the body is loaded normally, as shown in Fig. 5, the spring will contact the spring seats 20 and 22 at the nodes 24, a little distance inwardly from the ends of the springs so that the spring will be more rigid when under normal load. Under loaded impact, the springs flex further, perhaps even to a reverse arch position, bearing against portions of seats 20 and 22 closer together than the nodes 24, resulting in further shortening the effective length of the springs. The combination of the snubber pins 29 and 30 on the high side of the vehicle body limiting upward movement, and the graduated springing effect on the opposite side where the spring becomes stiffer as it goes downwardly, combines to give a good ride limiting the amount of pitch, rebound and side sway.

What I claim is:

1. In a heavy vehicle having a frame supported on an axle housing which in turn is supported on wheel means at opposite ends of said housing, the combination of an elongated multiple leaf spring extending in a fore-and-aft direction under said frame at each side thereof, connecting means between the mid-portion of each spring and said housing, spring seats on the under side of said frame engaging the front and rear ends of the upper leaf of each spring, and two snubber pins for each spring fixed relative to said frame and substantially engaging the lower side of the associated spring, in free unloaded condition, on opposite sides of said housing and between said housing and the ends of said spring and out of vertical alignment below the nearer edge of said spring seats toward said housing, at points where said snubber pins have a leverage when the vehicle rebounds to bend said spring upwardly at points on the axle side of each spring seat using the adjacent spring seat as a fulcrum.

2. In a heavy vehicle having a frame supported on an axle housing which in turn is supported on wheel means at opposite ends of said housing, the combination of an elongated multiple leaf spring extending in a fore-and-aft direction under said frame at each side thereof, connecting means between the mid-portion of each spring and said housing, spring seats on the under side of said frame engaging the front and rear ends of the upper leaf of each spring, and two snubber pins for each spring fixed relative to said frame and engaging the lower side of the associated spring, in free unloaded condition, on opposite sides of said housing and substantially midway between said housing and the ends of said spring.

3. The combination of claim 2 wherein said spring seats have curved surfaces engaging the associated leaf spring, each front spring seat curving upwardly toward the rear and each rear spring seat curving upwardly toward the front from the point of contact between spring leaf and seat when each spring is under normal load, whereby as each spring is more heavily loaded the span between the seat-engaging points of the top leaf of each spring is shortened, and during a pitching motion of the vehicle frame, as the span is shortened for the leaf spring on the lower side, the snubber pins engage the spring on the higher side to provide easier riding.

References Cited in the file of this patent

UNITED STATES PATENTS

| Number | Name | Date |
|---|---|---|
| 2,191,941 | Reid | Feb. 27, 1940 |
| 2,245,332 | Bradley et al. | June 10, 1941 |
| 2,273,503 | Couse | Feb. 17, 1942 |
| 2,337,073 | Townsend | Dec. 21, 1943 |
| 2,407,345 | Reid | Sept. 10, 1946 |
| 2,494,683 | Aspin | Jan. 17, 1950 |